United States Patent [19]

Hoelle et al.

[11] Patent Number: 5,431,517
[45] Date of Patent: Jul. 11, 1995

[54] APPARATUS AND METHOD FOR SECURING A BRACKET TO A FIXED MEMBER

[75] Inventors: James S. Hoelle, Hamilton; Nicholas J. Van Benschoten, W. Chester; Ivan H. Peterson, Hamilton, all of Ohio

[73] Assignee: General Electric Company, Cincinnati, Ohio

[21] Appl. No.: 181,148

[22] Filed: Jan. 12, 1994

[51] Int. Cl.⁶ .................. F16B 35/00; F16B 43/02
[52] U.S. Cl. ................... 411/366; 411/183; 411/546; 29/512
[58] Field of Search ............. 411/183, 352, 353, 366, 411/367, 533, 546; 29/512, 525.1

[56] References Cited

U.S. PATENT DOCUMENTS

| | | | |
|---|---|---|---|
| 3,121,995 | 2/1964 | Albani | 60/39.32 |
| 3,195,600 | 7/1965 | Middleton, Jr. | 411/353 X |
| 4,158,949 | 6/1979 | Reider | 60/39.32 |
| 4,705,425 | 11/1987 | Okawa | 411/546 X |
| 4,805,397 | 2/1989 | Barbier et al. | 60/39.32 |
| 4,815,908 | 3/1989 | Duran et al. | 411/353 |
| 4,878,795 | 11/1989 | Woodrow et al. | 411/353 X |
| 4,915,557 | 4/1990 | Stafford | 411/353 X |

Primary Examiner—Neill R. Wilson
Attorney, Agent, or Firm—Jerome C. Squillaro; Bernard E. Shay

[57] ABSTRACT

An apparatus for securing a bracket to a fixed member, the fixed member and the bracket each having at least one opening therethrough, where the apparatus includes a bolt having a threaded body and a head at a first end of the threaded body, where the bolt head abuts against a first surface of the fixed member, a nut threadably engaged to a second end of the threaded body, and a spacer positioned between the fixed member and the nut having an opening therethrough, the spacer having a flared portion at a first end which engages the bracket opening, wherein the threaded body of the bolt is positioned through the bracket opening, the spacer opening and the fixed member opening and secured together by the nut.

15 Claims, 2 Drawing Sheets

APPARATUS AND METHOD FOR SECURING A BRACKET TO A FIXED MEMBER

BACKGROUND OF THE INVENTION

1. Field of the Invention

The present invention relates to an apparatus and method for securing a bracket to a fixed member, and, more particularly, to an apparatus and method for securing a bracket to a fixed member in a gas turbine engine without heat treatment to increase the high cycle fatigue material properties thereof.

2. Description of Related Art

Brackets are utilized throughout gas turbine engines, including aircraft engines, in order to secure external system components such as tubes, cables, and the like. This is done in order to position such external system components in appropriate areas throughout the gas turbine engine, as well as prevent high cycle fatigue in such components. As is known, such external brackets are attached to various fixed surfaces on the gas turbine engine, including the case itself, a boss, or flanges. For example, such external brackets are oftentimes attached to an existing assembly which already secures a pair of flanges together.

Previously, brackets utilized on gas turbine engines have been either brazed or welded to an adjacent spacer, which is positioned between the bracket and the fixed member, in order to secure the two together. However, such a welding or tacking operation has been found to lead to a heat effected zone in the bracket which significantly reduces the high cycle fatigue material properties thereof. Utilizing a brazing operation has been found to require materials which are relatively brittle, thereby reducing the high cycle fatigue material capability, or materials (e.g., gold braze) which are costly. In addition, it will be noted that the process of welding or brazing the bracket and spacer together is relatively time consuming given the difficulty in fixturing the spacer to the bracket in order to provide the weld tack or braze.

Accordingly, a primary objective of the present invention is to provide an apparatus and method for securing a bracket to a fixed gas turbine engine member in a manner which does not require heat treatment, such as welding, brazing, or the like.

Another objective of the present invention is to provide an apparatus and method for securing a bracket to a fixed gas turbine engine member which reduces the time required for assembly and simplifies the assembly.

Yet another objective of the present invention is to provide an apparatus and method for securing a bracket to a fixed gas turbine engine member which has increased high cycle fatigue material properties.

These objectives and other features of the present invention will become more readily apparent upon reference to the following description when taken in conjunction with the following drawing.

SUMMARY OF THE INVENTION

In accordance with one aspect of the present invention, an apparatus is disclosed for securing a bracket to afixed member, the fixed member and the bracket each having at least one opening therethrough, where the apparatus includes a bolt having a threaded body and a head at a first end of the threaded body, the bolt head abuts against a first surface of the fixed member, a nut threadably engaged to a second end of the threaded body, and a spacer positioned between the fixed member and the nut having an opening therethrough, the spacer having a flared portion at a first end which engages the bracket opening, wherein the threaded body of the bolt is positioned through the bracket opening, the spacer opening and the fixed member opening and secured together by the nut.

BRIEF DESCRIPTION OF THE DRAWING

While the specification concludes with claims particularly pointing out and distinctly claiming the present invention, it is believed that the same will be better understood from the following description taken in conjunction with the accompanying drawing in which:

DETAILED DESCRIPTION OF THE INVENTION

Figure 1:
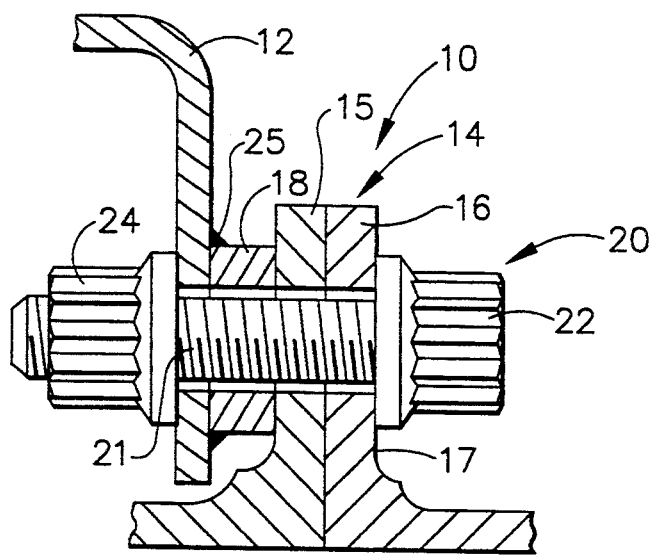
FIG. 1 is a cross-sectional view of a prior art apparatus for securing a bracket to a fixed member.

Referring now to the drawings in detail, wherein identical numerals indicate the same elements throughout the figures, FIG. 1 depicts a prior art apparatus 10 for securing a bracket 12 to a fixed member 14. As depicted in FIG. 1, fixed member 14 consists of a pair of flanges 15 and 16, but may be a single flange, a boss, or part of a casing. Accordingly, fixed member 14 may be any number of fixed items or stationary areas within a gas turbine engine.

FIG. 1 discloses a spacer 18 between bracket 12 and flange 15. It will be understood that a plurality of openings are formed in flanges 15 and 16, spacer 18, and bracket 12, whereby a bolt 20 is inserted therethrough. In particular, bolt 20 includes a threaded body 21 and a head portion 22. It will be understood that threaded body 21 is that part of bolt 20 which is inserted through the openings in flanges 15 and 16, spacer 18, and bracket 12. The head portion 22 of bolt 20 is of greater diameter than the threaded body and preferably is then also of greater diameter than the opening in flange 16. In this manner, head portion 22 of bolt 20 is able to lie adjacent the outer surface 17 of flange 16 and provide leverage for when nut 24 is attached to the opposite end of threaded body 21.

Most importantly, the prior art depicted in FIG. 1 includes a weld bead 25 or similar brazing material in order to secure bracket 12 and spacer 18. Such a construction, as indicated hereinabove, is subject to heat effected zones which significantly reduce the high cycle fatigue material properties of bracket 12.

Figure 2:
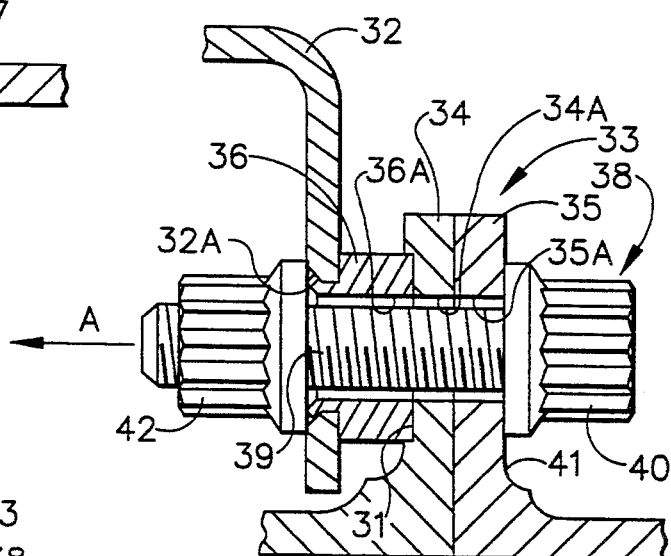
FIG. 2 is a cross-sectional view of the apparatus of the present invention which secures a bracket to a fixed member.

As depicted in FIG. 2, the apparatus of the present invention secures a bracket 32 to a fixed member 33 consisting of flanges 34 and 35. A spacer 36 is provided between bracket 32 and flange 34 in order to maintain the desired strain on bolt 38. It will be noted that flange 34 may include a counterbore 31 therein which helps to align spacer 36 and retain it in position. It will be understood by those skilled in the art that even when only flanges 34 and 35 are secured together by a bolt/nut combination, a spacer is generally utilized in order to provide the desired torque on the nut, and therefore the appropriate strain on the bolt. It is significant then to maintain the desired strain on the bolt by ensuring the same approximate amount of torque on the nut, as well as the same approximate thickness of the combined bracket and spacer thickness as with the original spacer thickness.

Figure 5:
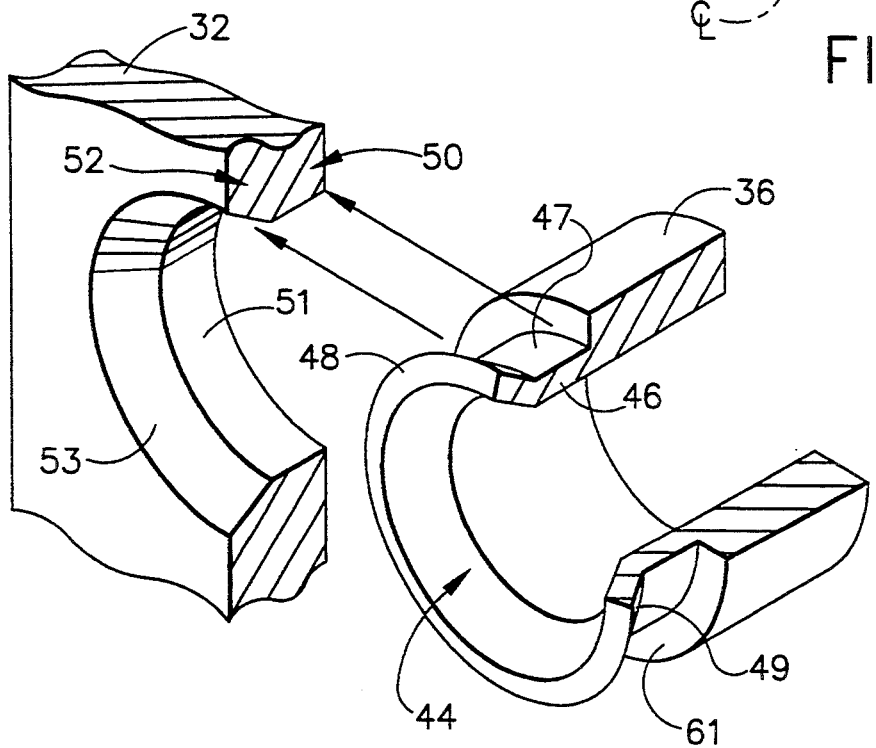
FIG. 5 is a partial exploded isometric view of the bracket and spacer in FIG. 2.

As indicated in the description of FIG. 1, openings 34A, 35A, 36A and 32A (as best shown in FIG. 5) are provided in flanges 34 and 35, spacer 36, and bracket 32, respectively, where the threaded body portion 39 of bolt 38 is inserted therethrough and head portion 40 of bolt 38 is retained against surface 41 of flange 35. A nut 42 is then threadably engaged onto threaded body 39 so as to secure together bracket 32, spacer 36 and flanges 34 and 35. Of course, it will be understood that there may be several openings in bracket 32 and fixed member 33, with a bolt 38, nut 42, and spacer 36 utilized at each such opening to provide retention about the periphery of bracket 32. Preferably, bolt 38 will be of a length where approximately two threads of threaded body 39 will protrude through nut 42 after assembly. Naturally, this will depend upon the various thicknesses of the fixed member 33, spacer 36, and bracket 32.

Figure 2A:
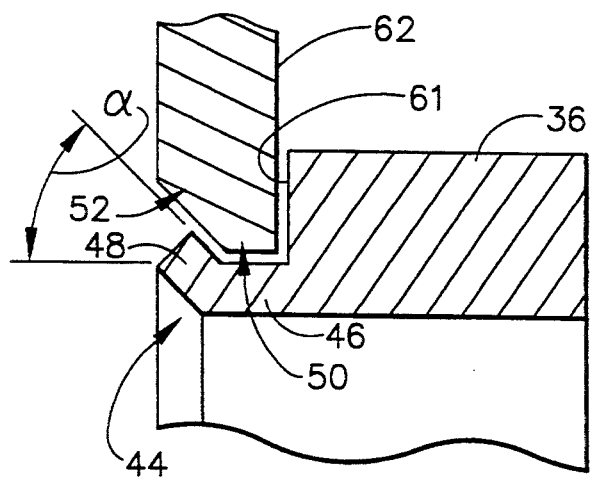
FIG. 2A is a partial cross-sectional view of the apparatus of FIG. 2.
Figure 4A:
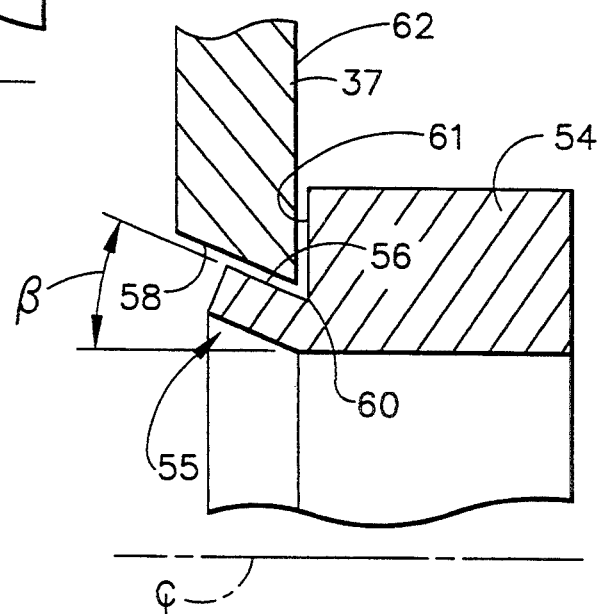
FIG. 4A is a partial cross-sectional view of the apparatus of FIG. 4.

As opposed to the prior art apparatus shown in FIG. 1, the apparatus for securing bracket 32 to fixed member 33 of the present invention utilizes a spacer 36 which is flared at one end. As best seen in FIG. 2A, flared portion 44 of spacer 36 includes a first portion 46 having a surface 47 substantially parallel to longitudinal axis A through bolt 38 and a second portion 48 having a surface 49 which is at an angle $\alpha$ to surface 47. The angle $\alpha$ between first surface 47 and second surface 49 must be optimized in order to reduce potential cracking and deformation at the intersection of surfaces 47 and 49. Accordingly, it is believed an angle $\alpha$ in the range of 30°–45° would best minimize such undesirable effects.

Opening 32A of bracket 32 is countersunk so as to include a first portion 50 having a surface 51, which is adjacent and parallel to surface 47 of first flared portion 46, and a second portion 52 having a surface 53 oriented at an angle to surface 51 of first portion 50, so as to be adjacent and parallel to surface 49 of second flared portion 48. In this way, opening 32A of bracket 32 is sized so as to provide an interference fit with spacer 36 and consequently be secured therewith.

Figure 3:
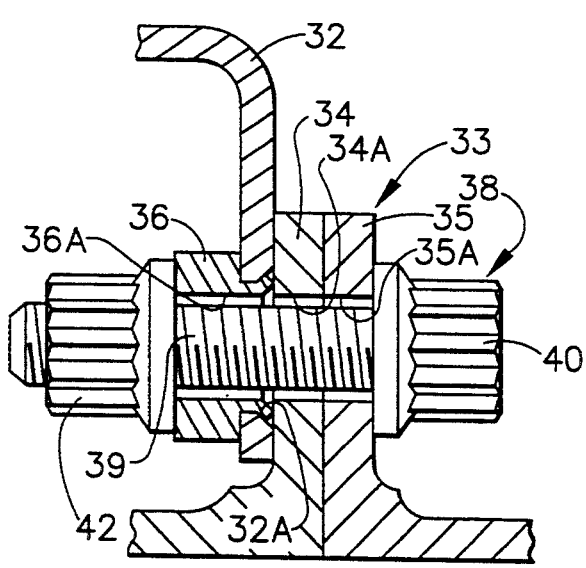
FIG. 3 is a cross-sectional view of the apparatus of the present invention which secures a bracket to a fixed member, where the bracket is positioned between a spacer and the fixed member.

FIG. 3 depicts an alternate configuration of the present invention, where bracket 32 is positioned adjacent a surface 31 of flange 34 and spacer 36 is then provided between bracket 32 and nut 42. In some instances, the fixed member to which the bracket is attached may require this alternate positioning of the spacer 36 and its flared portion 44, but in all other respects is the same as the assembly described in FIG. 2.

Figure 4:
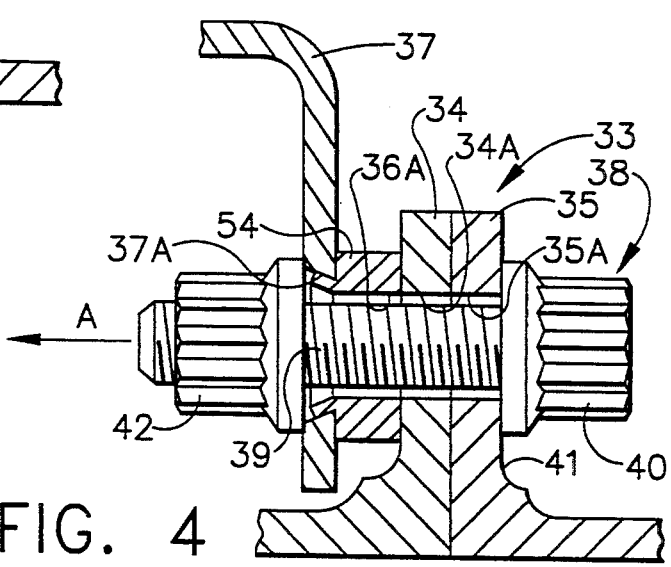
FIG. 4 is a cross-sectional view of an alternate embodiment of the apparatus of the present invention for securing a bracket to a fixed member.

FIG. 4 depicts an alternate embodiment regarding the flared portion of spacer 36 and corresponding openings 32A of bracket 32, but otherwise is identical to the apparatus depicted in FIG. 2. It will be seen that flared portion 55 of spacer 54 includes only a single surface 56 oriented at an angle $\beta$ to longitudinal axis A of bolt 38. Correspondingly, bracket 37 includes a beveled opening 37A as shown by surface 58. Surface 58 is parallel to surface 56 of flared portion 55 and is sized so as to provide an interference fit therewith. It will be understood that due to the stress at point 60 of bracket 37 that angle $\beta$ will be optimized (preferably in the range of 30°–45°) to reduce such stress. The alternate embodiment depicted in FIG. 4 is preferably utilized when bracket 37 is extremely thin (e.g. 60 mils or less). This is because the countersink bracket opening 32A in FIG. 2 would be such an extremely thin piece of metal that it would be difficult to provide the double surface flared portion.

It should be noted that a significant advantage of the present invention, where a flared spacer is utilized to secure a bracket to a fixed member, over the prior art apparatuses which use tack welding or brazing, is the time saved. In particular, the flared spacers of the present invention may be formed by means of a hydraulic press around the openings 32A and 37A in brackets 32 and 37 in conjunction with a die sized for such purpose. In this manner, flared spacers may be produced very quickly and efficiently, as opposed to experiencing the difficulty in fixturing a spacer to the bracket during tack welding or brazing operations.

Further, it will be understood that use of the flared spacer of the present invention ensures a proper seating of the bracket against the spacer, particularly with respect to surfaces 61 and 62 thereof.

In light of the foregoing description of the apparatus of the present invention, the method for securing brackets 32 and 37 to fixed member 33, involves removing the nut from the threaded body, removing the spacer from the threaded body, and providing a modified spacer on the threaded body where the modified spacer has a flared portion at one end. Then the brackets are positioned on the threaded body through an opening formed therethrough, with the bracket opening having at least one surface which abuts the flared spacer portion. Thereafter, the nut is replaced on the threaded body and tightened to the specified torque. As noted above, the combined thickness of the modified spacer and the bracket are intended to be substantially equal to the original spacer thickness. It will also be understood, as seen in FIGS. 2 and 3, that the bracket may be positioned on the threaded body before or after the spacer.

Having shown and described the preferred embodiments of the present invention, further adaptations of the apparatus for securing a bracket to a fixed member in a gas turbine engine can be accomplished by appropriate modifications by one of ordinary skill in the art without departing from the scope of the invention.

What is claimed:

1. An apparatus for securing a bracket to a fixed stationary member, said stationary member and said bracket each having at least one opening therethrough, comprising:

(a) a bolt having a threaded body and a head at a first end of said threaded body, said bolt head abutting against one of said bracket and said stationary member;

(b) a nut threadably engaged to a second end of said threaded body; and (c) a spacer positioned between said stationary member and said nut having an opening therethrough, said spacer having a flared end which extends into and engages at least one mating surface within said bracket opening to cause said spacer and said bracket to be secured together; wherein said threaded body of said bolt is positioned through said bracket opening, said spacer opening and said stationary member opening and secured together by said nut.

2. The apparatus of claim 1, wherein said bracket is positioned between said spacer and said stationary member.

3. The apparatus of claim 1, wherein said bracket is positioned between said spacer and said nut.

4. The apparatus of claim 3, wherein said stationary member includes a counterbore therein, whereby said spacer is partially retained therein.

5. The apparatus of claim 1, wherein said flared end includes a first surface substantially parallel to a longitudinal axis of said bolt and a second surface at an angle to said first surface.

6. The apparatus of claim 5, wherein said bracket opening is countersunk to include a first mating surface substantially parallel to said longitudinal axis of said bolt and a second mating surface positioned at an angle to said first surface, said first mating surface lying adjacent to and contacting said flared end first surface and said second mating surface lying adjacent to and contacting said flared end second surface.

7. The apparatus of claim 5, wherein the angle between said first and second surface is in the range of 30°–45°.

8. The apparatus of claim 1, wherein said flared end includes a single surface at an angle to a longitudinal axis of said bolt.

9. The apparatus of claim 8, wherein said angle is in the range of 30°–45°.

10. The apparatus of claim 8, wherein said bracket opening includes a bevelled mating surface at an angle to said longitudinal axis of said bolt, said mating surface lying adjacent to and contracting said flared end surface.

11. A method for securing a bracket to an assembly, said assembly comprising a fixed member and a spacer of a predetermined thickness, each having an opening formed therethrough, a bolt having a threaded body and a head at one end thereof, and a nut threadably engaged to said threaded body, wherein said threaded body is positioned through said fixed member and said spacer openings and secured together by said nut, said method comprising the steps of:

(a) removing said nut from said threaded body;

(b) removing said spacer from said threaded body;

(c) providing a modified spacer on said threaded body, said modified spacer having a flare at one end;

(d) providing said bracket on said threaded body through an opening formed therethrough, said bracket opening having at least one surface which abuts said spacer flared portion; and (e) replacing said nut on said threaded body.

12. The method of claim 11, wherein the combined thickness of said modified spacer and said bracket are substantially equivalent to said original spacer thickness.

13. The method of claim 11, wherein said bracket is positioned on said threaded body before said spacer.

14. The method of claim 11, wherein said bracket is positioned on said threaded body after said spacer.

15. The method of claim 11, wherein said bolt experiences a strain after said modified spacer and bracket is positioned on said threaded body substantially equivalent to the strain experienced by said bolt in said original assembly.

* * * * *